United States Patent
Swoboda

(10) Patent No.: US 9,083,623 B2
(45) Date of Patent: Jul. 14, 2015

(54) INSERTING SOURCE, SEQUENCE NUMBERS INTO DATA STREAM FROM SEPARATE SOURCES

(71) Applicant: Texas Instruments Incorporated, Dallas, TX (US)

(72) Inventor: Gary L. Swoboda, Sugar Land, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 93 days.

(21) Appl. No.: 13/793,009

(22) Filed: Mar. 11, 2013

(65) Prior Publication Data

US 2013/0238946 A1    Sep. 12, 2013

Related U.S. Application Data

(60) Provisional application No. 61/609,446, filed on Mar. 12, 2012.

(51) Int. Cl.
*H03M 13/00* (2006.01)
*H04L 12/26* (2006.01)

(52) U.S. Cl.
CPC ............ *H04L 43/10* (2013.01); *H04L 43/0835* (2013.01)

(58) Field of Classification Search
CPC . H04L 43/10; H04L 43/0835; H04L 43/0847; H04L 47/34; H04L 67/26

USPC .......... 714/748–751, 715, 746, 776; 370/312, 370/328; 709/203
See application file for complete search history.

(56) References Cited

U.S. PATENT DOCUMENTS

| | | | | |
|---|---|---|---|---|
| 6,141,785 A | * | 10/2000 | Hur et al. | 714/748 |
| 2010/0110958 A1 | * | 5/2010 | Racz et al. | 370/312 |
| 2013/0070682 A1 | * | 3/2013 | Kim et al. | 370/328 |

OTHER PUBLICATIONS

Mahani et al., Assessing the completeness of woreless-side tracing mechanisms, 2007, IEEE, pp. 1 to 10.*
Gurtov et al., Multi-layer protocol tracing in GPRS Network, 2002, IEEE, pp. 1 to 5.*

* cited by examiner

*Primary Examiner* — Shelly A Chase
(74) *Attorney, Agent, or Firm* — Lawrence J. Bassuk; Charles A. Brill; Frank D. Cimino

(57) ABSTRACT

A method of detecting lost data within a data stream by inserting sequence numbers within the stream. Network data blocks to be transmitted are assembled from data chunks, where each data chunk contains a sequence number. Where the data is originating from multiple sources, the sequence numbers are labeled with an unique source ID, and are inserted into the composite data stream after one or more data chunks are generated.

4 Claims, 3 Drawing Sheets

INSERTING SOURCE, SEQUENCE NUMBERS INTO DATA STREAM FROM SEPARATE SOURCES

CLAIM OF PRIORITY

This application claims priority under 35 U.S.C. 119(e)(1) to Provisional Application No. 61/609,446 filed 12 Mar. 2012.

TECHNICAL FIELD OF THE INVENTION

The technical field of this invention is trace protocol efficiency.

BACKGROUND OF THE INVENTION

At times trace information is transmitted over a lossy network. With current approaches it is not possible to reliably determine whether data has been lost. This problem can be overcome by inserting sequence numbers within the data stream. This is especially helpful when the data from multiple sources is merged before transmission.

SUMMARY OF THE INVENTION

The detection of lost data within a trace data stream can be overcome by inserting sequence numbers within the data stream. These sequence numbers are inserted after n data entries, where n may be a fixed or variable number but has an upper limit that provides for the detection of the loss of the smallest data block transmitted. This is especially helpful when the data from multiple sources is merged before transmission using the MIPI trace wrapping protocol.

BRIEF DESCRIPTION OF THE DRAWINGS

These and other aspects of this invention are illustrated in the drawings, in which.

DETAILED DESCRIPTION OF PREFERRED EMBODIMENTS

In a system where trace data is transferred using an interface such as Ethernet or USB, errors can occur which are either undetected or if detected require the retransmission of the data that found to be in error. In cases where the error rate is low or errors may not be detected it is desirable to include information in the data stream that can be used to detect the lost of data by a network or failure to retransmit the data by the source.

Figure 1:
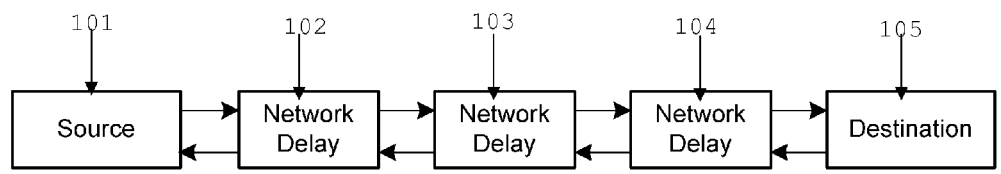
FIG. 1 shows a block diagram of a typical data transmission system.

Systems may be constructed in a manner that transports data as shown in FIG. 1 where data is originating in source 101 and is transmitted to destination 105 through various network elements 102 through 104, with said elements introducing possible delays. There are two types of network architectures, those where 1) the network takes possession of the data submitted for transmission, creates a local copy, and then handles retries of data as needed without the knowledge or assistance of the source, and 2) where the network does not take possession data submitted for transmission, relying on the source maintaining the data until the network notifies the source that the data has been delivered to the destination or another network (that takes possession of the data) successfully.

Figure 2:
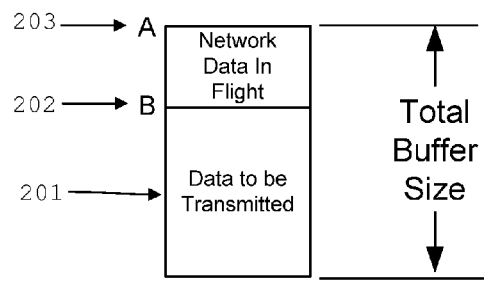
FIG. 2 illustrates a typical shared buffer data transmission system.

With the second type of network described the network either shares the buffering with the source (exchanging ownership of the buffer) or the buffering is maintained by the source. In either case the buffering must accommodate the amount of network data that can be in flight before an error is detected and a retry of the transmission is attempted. FIG. 2 shows a typical buffer 201. Data from pointer A (202) in the buffer to pointer B (203) in the buffer is transmitted before the network determines that the data at pointer 202 in the buffer must be retransmitted. Two pointers must be maintained, the $1^{st}$ defines the location of the last transmitted data that has not been confirmed as delivered. The $2^{nd}$ defines the location of the next data to be transmitted in the absence of an error notification. When an error notification occurs, the value of the $2^{nd}$ pointer is set to the value of the $1^{st}$ pointer.

This is problematic for systems that where: 1) the amount of data storage required at the source must be minimized, 2) data creation rates approach or reach parity with network transmission rates, or 3) source buffering is implemented as a FIFO for simplicity reasons.

In the first case, the amount of storage required for network data in flight may be substantial, depending on network characteristics, driving up the size of the buffer needed. In the second case, a retry would cause retransmission of data that has been transmitted but not confirmed as delivered. If the rate the buffer fills and drains is roughly the same, it is possible the fill would have to be stopped in order to not overrun the data in buffer, causing the loss of data at the source. A gap in trace data would occur in this case. The mere existence of a retry of data transmission would create this gap. This gap would occur irrespective of whether the controller takes possession of the data or requires the source to maintain the data until it is delivered. In the third case the retry of data is not possible if source data storage is implemented as a FIFO and the network does not take possession of transmission data when the FIFO is read, as FIFO data is readable only once.

Figure 3:
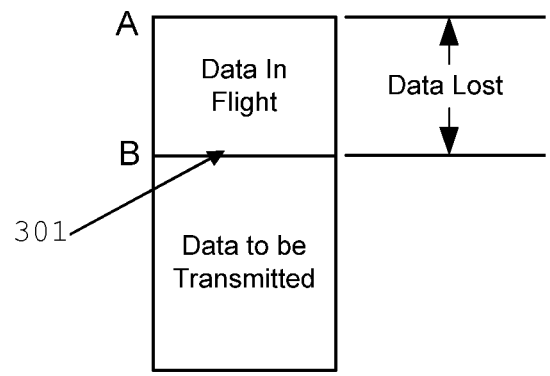
FIG. 3 shows a single pointer buffer system.

With networks that do not take possession of transmission data and have low error rates, a mechanism that ignores the network retry mechanism but identifies the occurrence of errors is desirable and is the subject of this invention. In this case the network controller is implemented with two pointers, where the current read pointer can be backed up to retransmit previously transmitted data. In actuality, only a single read pointer is used at the destination where the data is read. In other words the source data is assuming it is already sequential with no re-read of the data permitted. As shown in FIG. 3, such an implementation with one pointer 301 in the data source referencing the next data to be transmitted looses all data submitted for transmission that has not been delivered successfully prior to the point the network controller desires to retry (move the read pointer within the source delivering the data from B to A) because the retry buffer management is unimplemented (moving the read pointer from B to A within the source is not possible).

In the case where data may be lost due to bypassing the networks retry mechanism or other causes, the client consuming the data at the destination must be aware that data was lost. This can be accomplished by embedding sequence numbers in the data transmission. These sequence numbers provide a means for the client consuming the data to determine that data was lost. When the sequence numbers are inserted in the data stream at a rate that assures at least one sequence number is present in each network data block (the smallest increment that can be lost), the client has sufficient information to confirm data integrity and handle cases where data is lost.

This approach is especially compatible with transmission of data that incorporates a wrapping protocol. One such protocol is the MIPI (Mobile Industry Processor Interface) Trace Wrapping Protocol. The wrapping protocol handles the merging of data sources into a single stream, and it provides source and data information within the stream. In this case the insertion of sequence numbers is merely identified as data originated by a sequence number generator. The sequence number generator's generation of data is triggered by the amount of data generated by other sources in a manner that assures the presence of sequence numbers in the data stream occurs with sufficient density to allow the detection of lost data by the client consuming the data stream.

Figure 4:
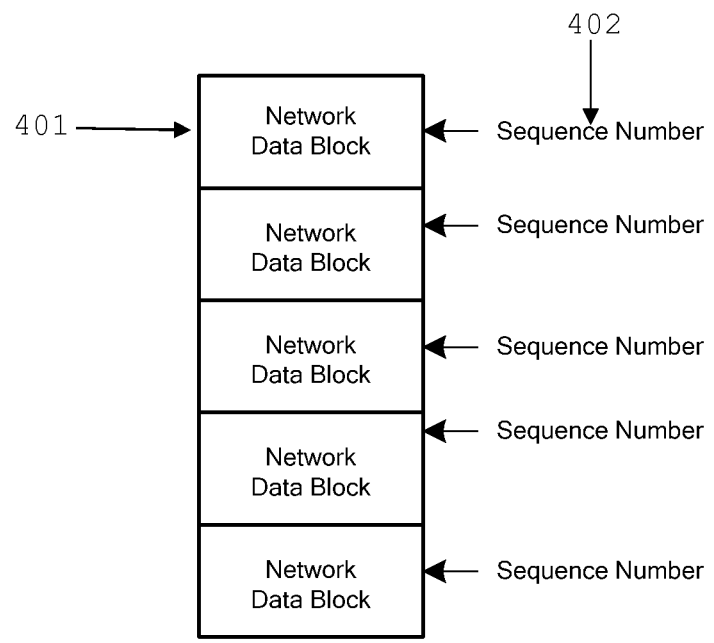
FIG. 4 shows the data block structures with embedded sequence numbers.

An example of sequence numbers within network data blocks is shown in FIG. 4. In this case, each network data block 401 contains a sequence number 402 somewhere within the block. A lost network data block is easily detectable as there is a gap in consecutive sequence numbers.

Figure 5:
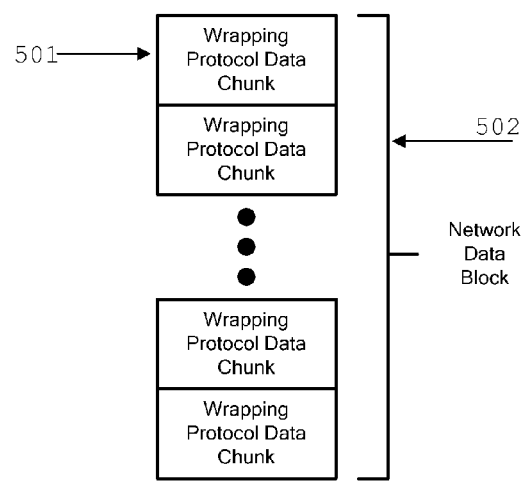
FIG. 5 illustrates the network data block structure with embedded data chunks.

When a trace data implementation utilizes a wrapping protocol, the wrapping protocol generates a continuous stream of data created by merging data from multiple sources. The resulting data stream contains both the source identification numbers and the data generated by the source. In some cases the wrapping protocol generates fixed size chunks of data that pack neatly into a network data block 502 as shown in FIG. 5.

Figure 6:
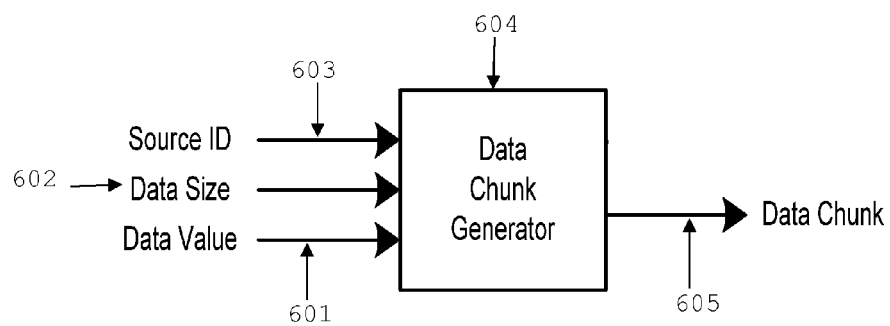
FIG. 6 shows a method of generating the data chunks.

The wrapping protocol data chunks are generally created as shown in FIG. 6. Data values 601, their size 602, and their origin 603 are sequentially provided to the data chunk generator 604 which turns them into data chunks 605, with these chunks having a fixed size.

An other implementation of the architecture shown in FIG. 6 to add sequence numbers is possible by utilizing the wrapping protocol characteristics to embed a sequence number within a data chuck by supplying a sequence number with a unique Source ID following the generation of some number of data chunks. Other ways of triggering the insertion of a sequence number using the wrapping protocol are possible and are claimed as part of this invention.

What is claimed is:

1. A method of detecting lost data in a data transmission from a data source to a data destination, comprising:
    merging the data from a plurality of separate data sources into a single data stream;
    periodically inserting a sequence number into the source data stream, the sequence number containing a unique source identification identifying the data source; and
    detecting missing sequence numbers at the data destination stream indicating lost data.

2. The method of claim 1 including formatting the source data stream into a plurality of network data blocks; and inserting a sequence number into each network data block.

3. The method of claim 1 including assembling the network data blocks from one or more fixed length data chunks; and generating each data chunk from a source identification, the data size, and the data to be transmitted.

4. The method of claim 3 in which the sequence number is inserted into at least one data chunk in each network data packet.

* * * * *